United States Patent [19]

Weaver et al.

[11] 3,868,149
[45] Feb. 25, 1975

[54] MATERIAL DISTRIBUTING APPARATUS FOR A SILO

[76] Inventors: Curtis C. Weaver, 901 S. Congress St., Polo, Ill. 61064; Robert E. Kirkpatrick, 506 N. Taft St., Humboldt, Iowa 50548

[22] Filed: Mar. 21, 1974

[21] Appl. No.: 453,273

[52] U.S. Cl. .................................................. 302/60
[51] Int. Cl. ........................ B65g 53/40, A01f 25/16
[58] Field of Search ............. 302/60, 61, 59, 10; 214/17 C

[56] References Cited
UNITED STATES PATENTS

| | | | |
|---|---|---|---|
| 2,752,204 | 6/1956 | Broughton | 302/60 |
| 3,459,457 | 8/1969 | Weaver et al | 302/60 |
| 3,698,576 | 10/1972 | Gillette | 302/60 |

*Primary Examiner*—Richard A. Schacher
*Assistant Examiner*—Jeffrey V. Nase
*Attorney, Agent, or Firm*—Rudolph L. Lowell

[57] ABSTRACT

The material distributing apparatus is located within and adjacent the top of a silo and functions to evenly distribute silage in a symmetrical cone shape over the cross-sectional area of the silo. Material from the delivery end of a material conveyor tube is first directed against a radially positioned deflector member that is pivotally supported for adjustable movement in a path extended longitudinally of the silo. The radially positioned deflector member in turn directs the material against an upright deflector member that is pivotally supported for adjustable movement in a path extended transversely of the silo. Material from the upright deflector member is then directed downwardly in a direction axially of the silo.

5 Claims, 10 Drawing Figures

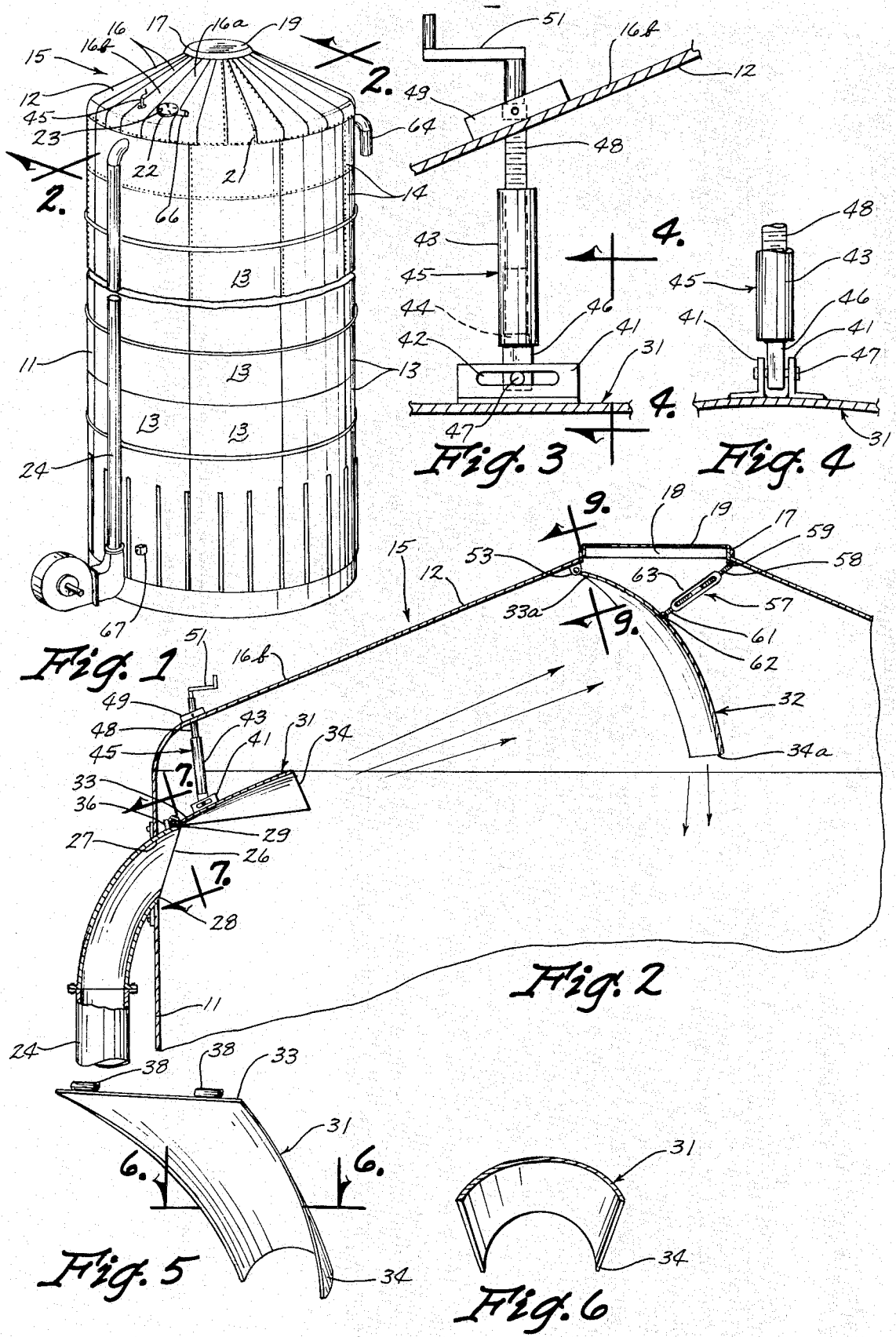

MATERIAL DISTRIBUTING APPARATUS FOR A SILO

SUMMARY OF THE INVENTION

The silage distributing apparatus is of a simple construction adapted for assembly in silos of air sealed type such as the 'Harvestore' silo made by Harvestore Products, Inc. of Arlington Heights, Illinois, in which a silage conveyor tube is open to and terminates in the upper portion of the silo. The apparatus is adjustable to direct silage material discharged from the delivery end of the conveyor tube in a first direction generally radially inwardly of the silo and then in a second direction generally axially and downwardly of the silo. Adjustment is predicated on the tupe of silage material being stored and is required only at the start of the silo filling operation. As a result, the silo is readily and efficiently filled to its maximum capacity by the elimination of the usual piling of the material against a side of the silo wall or in a non-symmetrical cone shape relative to the transverse cross-sectional area of the silo. The installation and adjustment of the apparatus is readily accomplished through access doors or hatch openings provided in the silo roof.

BRIEF DESCRIPTION OF THE DRAWING

FIG. 1 is a perspective view of a silo having a material distributing apparatus of this invention installed therein;

FIG. 2 is an enlarged fragmentary sectional view taken on line 2—2 in FIG. 1, showing the assembly of the distributing apparatus relative to the upper portion of the silo;

FIG. 3 is an enlarged elevational view of an adjusting mechanism shown generally in FIG. 2 and which forms part of the distributing apparatus;

FIG. 4 is a sectional detail view taken along the line 4—4 in FIG. 3;

FIG. 5 is a perspective view of a material deflecting member that forms part of te apparatus;

FIG. 6 is an enlarged transverse sectional view taken on the line 6—6 of FIG. 5;

DETAILED DESCRIPTION OF THE INVENTION

Figure 7:
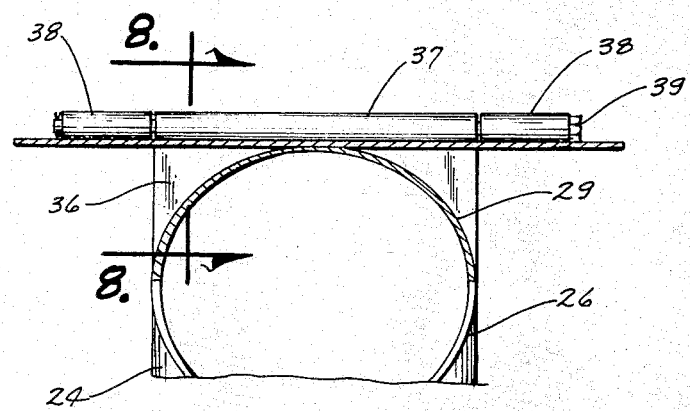
FIG. 7 is an enlarged detail sectional view on line 7—7 in FIG. 2.

Referring to FIG. 1 of the drawings, there is illustrated a silo, designated generally as 15, having a circular side wall 11 to which is secured a dome shaped roof 12. The silo is of a well-known air seal type known as 'Harvestore,' previously mentioned, in which the side wall 11 is comprised of a plurality of rectangularly shaped longitudinally arcuate panel members 13 that are secured together by bolt assemblies 14. The roof 12 is comprised of a plurality of generally pie-shaped panels 16 the inner or upper ends of which are secured to a circular crown plate 17 having a central opening or hatch 18 normally closed by a removable cover 19. The lower ends of the roof panel 16 are curved downwardly for securement as by bolt assemblies 21 to the side wall 11. One of the roof panels, indicated as 16a, has a circular opening or hatch 22 which is normally closed by a cover means 23.

An upright material conveyor tube 24 extended exteriorly alongside of the silo has an upper or delivery end 26 projected through an opening 27 formed in the silo side wall 11 at a position immediately below the roof 12 (FIG. 2). The terminal face of the delivery end 26 lies in an inclined plane so that the lower side 28 of such delivery end is located at the side wall 11, while the upper side 29 thereof extends inwardly of the silo side wall 11 for a purpose to appear later.

The distributing apparatus of this invention includes a pair of material deflector members 31 and 32, hereinafter for convenience to be referred to as an "outer" deflector member and an "inner" deflector member, respectively. The outer deflector member 31 (FIGS. 2, 5, and 6) is formed from a flat metal sheet of a substantially rectangular shape into a generally trough shape in transverse cross section. Thus, as best appears in FIG. 5, the end 33 of the outer deflector member 31 extends linearly over the full transverse dimension of the deflector, while the end 34 is of a substantially semicircular shape transversely of the deflector member 31. Between its ends 33 and 34, the outer deflector member 31 is of a transversely curved shape generated about progressively decreasing radii so that the radius of the curvature at the end 34 is appreciably less than the radius of the curvature adjacent the end 33. It will also be noted that the outer deflector member 31 is of a curved shape longitudinally thereof.

Figure 8:
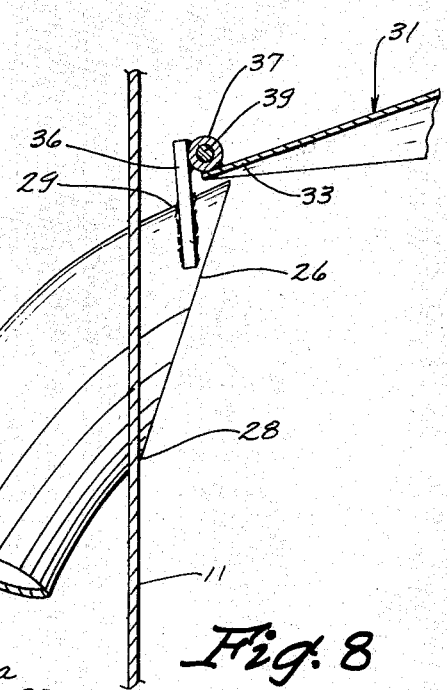
FIG. 8 is a sectional view as seen on line 8—8 in FIG. 7.

The outer delfector member 31 is pivotally supported on the upper side 29 of the conveyor delivery end 26 and is normally projected in a direction radially and inwardly of the silo 15. For this purpose, and as shown in FIGS. 7 and 8, the delivery end 26 is partially encirculed by a transversely extended mounting plate 36 which is suitably secured as by welding to the conveyor tube 24. The upper end of the plate 36, on the side thereof facing inwardly of the silo, carries a tubular bearing 37 arranged transversely of the conveyor tube 24 and of a length substantially equal to the diameter of the conveyor tube. The end 33 of the outer deflector member 31 has secured thereto a pair of bearing members 38 transversely spaced a distance apart to receive therebetween the bearing member 37 on the mounting plate 36. A pivot or connecting pin 39 extendible through the aligned bearings 37 and 38 pivotally supports the outer deflector member 31 for pivotal movement in a path extended longitudinally of the silo 15.

To pivotally adjust the outer deflector member 31 relative to the delivery end 26 of the conveyor tube 24 the convex or upper side of the outer deflector member 31 at a position intermediate the ends 33 and 34 thereof carries a pair of circumferentially spaced radially projected connecting members 41 which are formed with oppositely arranged slots 42 extended longitudinally of the outer deflector member 31. An internally threaded cylindrical member 43, which forms part of an adjusting mechanism indicated generally as 45, is closed at its lower end by a plug 44 that has an outwardly projected tongue 46 receivable between the connecting members 41. A pin member 47 movable in the slots 42 and inserted through the tongue 46 provides a lost motion connection between the member 43 and the connecting members 41. A screw shaft 48 threadable within the cylinder member 43 extends upwardly through a roof panel, indicated at 16b, for rotatable support in a bearing unit 49 mounted on the panel 16b exteriorly of the silo 15. On the manipulation of a crank 51, at the upper end of the shaft 48, the member 43 is movable axially of the screw shaft to provide for the up and down pivotal adjustment of the outer deflector member 31.

It is seen, therefore, that the outer deflector member 31 functions to direct material discharged from the delivery tube 24 against the concave side thereof in a direction generally radially inwardly of the silo 15 and against the inner deflector member 32 which is pivotally suspended from the central portion of the roof 12 at a position opposite the delivery end 26 of the conveyor tube. By virtue of the transverse and longitudinal curved shape of the outer deflector member 31, material striking against the concave side thereof is directed longitudinally and inwardly of such deflector member toward its end 34. As a result, material from the conveyor tube 24 is collected by the concave surface of the outer deflector member 31 and channeled by such surface for discharge in a stream toward and against the inner deflector member 32.

The inner deflector member 32 corresponds in shape to the outer deflector member 31 but is of a relatively larger size than the outer deflector member 31. Thus, in one embodiment of the invention the inner deflector member 32 is formed from a piece of sheet metal material having a width of 36 inches and a length of 4 feet with a curved shape at the discharge end 34a thereof being generated with a radius of about 6 inches. The outer deflector member 31 is about half the size of the inner deflector member 32 and is formed from a piece of sheet metal material 18 inches wide and 2 feet long with its discharge end 34 generated about a radius of 4 inches.

Figure 9:
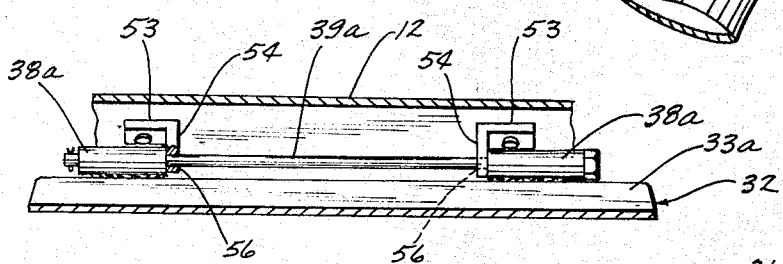
FIG. 9 is an enlarged detail sectional view taken along line 9—9 in FIG. 2.

To pivotally suspend the inner deflector member 32, there is suitably attached to the inner surface of the roof 12 at that side of the roof central opening 18 adjacent the delivery end 26 of the conveyor tube 24, a pair of brackets 53 (FIG. 9) having depending legs 54 spaced a distance apart to be received between the bearing members 38a, secured to the end 33a of the inner deflector member 32. A pivot pin 39a extended through the bearings 38a and corresponding holes 56 in the depending legs 54 pivotally supports the inner deflector member 32 for pivotal swinging movement in a path transversely of the silo 15.

Adjustment of the inner deflector member 32 is accomplished by a turnbuckle assembly 57 which includes a first connecting member 58 pivotally connected at 59 to the roof 12 at the side of the central opening 18 opposite the mounting members 53. A second connecting member 61 is pivotally connected at 62 to the convex side of the inner deflector member 32 at a position intermediate its ends 33a and 34a. The inner ends of the connecting members 58 and 61 are externally threaded and adjustably interconnected in a well-known manner by a turnbuckle 63. Access to the turnbuckle 63 for adjusting the inner deflector member 32 is through the central roof opening 18.

Figure 10:
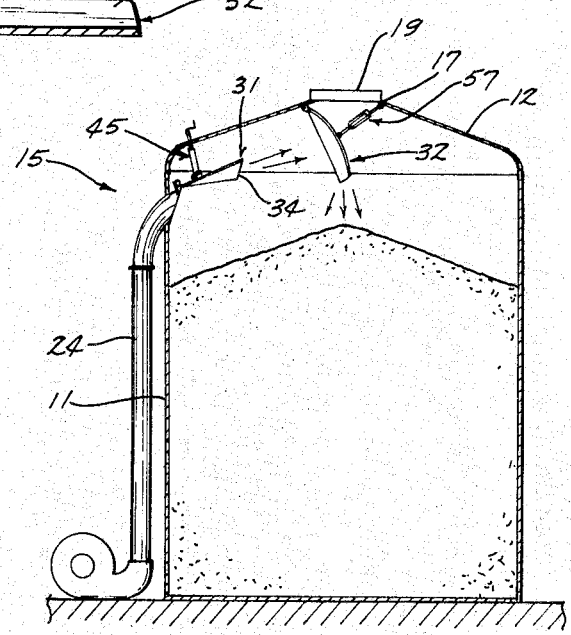
FIG. 10 is a diagrammatic illustration of a silo showing the symmetrical filling thereof by the apparatus of this invention.

In the use of the material spreader apparatus the deflector members 31 and 32 are relatively adjusted so that material striking against the concave side of the inner deflector member 32 is directed in a direction generally axially downwardly of the silo 15. As illustrated in FIG. 10, material discharged by the inner deflector member 32 is thus directed so as to form a pile centrally of the silo floor which on being progressively enlarged provides for the material being distributed in a symmetrical cone shape over the cross-sectional area of the silo. Since this cone shape is maintained during the complete filling operation, the silo 15 is filled to its maximum capacity without requiring further adjustment of the deflector members.

It is contemplated that during the silo filling operation the central opening 18 be closed by its cover 19 and that the opening 22 be in an open position to maintainn an atmospheric pressure within the silo in the manner disclosed in U. S. Pat. No. 3,459,457. On filling of the silo the opening 22 would be closed to complete the air seal of the silo and to protect the material therein against spoilage. In order to compensate for internal gas pressure changes within the silo, usual breather bags (not shown) located externally of the silo are connectible to a breather pipe 64 which isopen to the top of the silo 15 (FIG. 1). It is further contemplated that the cover 23 for the opening 22 be opened and closed by an electrical motor 66 mounted on the roof 12 in operative association with the cover 23 and having in the circuit thereof a switch 67 carried on the base of the silo and exteriorly thereof.

Although the invention has been described with respect to a preferred embodiment thereof, it is to be understood that it is not to be so limited since changes and modifications can be made therein which are within the full intended scope of this invention as defined by the appended claims.

We claim:

1. An apparatus comprising a silo having a circular side wall, a roof and a material conveyor tube having a delivery end open to said silo through an upper portion of the silo and a material distributing apparatus comprising:
    a. a pair of material deflector members,
    b. means pivotally supporting one of said deflector members adjacent the top side of the delivery end of said conveyor tube for up and down pivotal movement in a path longitudinally of the silo,
    c. means pivotally suspending the second one of said deflector members from a central portion of said roof for pivotal swinging movement in a path transversely of said silo, and
    d. means for relatively adjusting said first and second deflector members such that during filling of the silo material from said conveyor tube discharged against said first deflector member is directed against said second deflector member for discharge from said second deflector member in a direction axially and downwardly of said silo.

2. An apparatus comprising a silo having a circular side wall, a roof and a material conveyor tube having a delivery end open to said silo through an upper portion of the silo side wall and a material distributing apparatus comprising:
    a. a first pivoted elongated material deflector member of a curved shape in transverse cross section located within said silo with one end thereof adjacent said delivery end and extended from said one end radially inwardly of said silo with the convex side thereof facing said roof,
    b. means pivotally supporting the one end of said deflector member on the upper side of the delivery end of said conveyor tube for up and down adjustable movement of the opposite end thereof, c. means for pivotally adjusting said first deflector member mounted on the silo and including an actuator member located exteriorly of the silo, d. a second pivoted elongated material deflector member of a curved shape in transverse cross section pivotally suspended from one end thereof from said roof at a position opposite the delivery end of said conveyor tube, said second deflector member having the concave surface thereof facing said delivery end; and e. means extended between and connected to said second deflector member for pivotally adjusting said second deflector member relative to said first deflector member.

3. The apparatus according to claim 2 wherein:

a. said second deflector member is located at the side of the roof central portion which is adjacent the delivery end of said conveyor tube.

4. The apparatus according to claim 2, wherein:

a. at least one of said material deflector members from said one end to the opposite end thereof has the transverse curvature thereof generated about progressively decreasing radii so that material striking the concave side of said one deflector member is directed longitudinally and inwardly toward the opposite end thereof for discharge longitudinally from the transverse central portion of said opposite end.

5. The apparatus according to claim 4 wherein;

a. said one deflector member is of a curved shape in longitudinal cross section.

* * * * *